(12) United States Patent
Patil et al.

(10) Patent No.: US 7,309,429 B2
(45) Date of Patent: Dec. 18, 2007

(54) GRANULAR FILTRATION DEVICE FOR WATER

(75) Inventors: Arvind S. Patil, Davidson, NC (US); Glenn F. Cueman, Huntersville, NC (US)

(73) Assignee: Ricura Technologies, LLC, Hickory, NC (US)

( * ) Notice: Subject to any disclaimer, the term of this patent is extended or adjusted under 35 U.S.C. 154(b) by 5 days.

(21) Appl. No.: 11/339,344

(22) Filed: Jan. 25, 2006

(65) Prior Publication Data

US 2006/0163137 A1      Jul. 27, 2006

Related U.S. Application Data

(60) Provisional application No. 60/647,192, filed on Jan. 25, 2005.

(51) Int. Cl.
*B01D 27/14*      (2006.01)
(52) U.S. Cl. ........................ 210/266; 210/289
(58) Field of Classification Search ............... 210/266, 210/289
See application file for complete search history.

(56) References Cited

U.S. PATENT DOCUMENTS 5,443,735 A  *  8/1995  Kirnbauer et al. .......... 210/668

* cited by examiner

*Primary Examiner*—Chester T. Barry
(74) *Attorney, Agent, or Firm*—Clements Walker; Gregory N. Clements

(57) ABSTRACT

The invention is a granular media filter for in-line liquid applications that allows media as fine as 44 micron to be used to increase the removal of contaminants from the liquid with adequate flows consisting of a specific arrangement. A flow distributor has a non-woven fiber web welded to it; followed by a mixture of fine particle media (finer than 20×50 mesh); followed by a compressible chlorine resistant open cell polyurethane foam, then a 5 micron rated melt-blown fiber tube attached to the outlet end by melt adhesive on one end and closed with a plastic plug on the other end. The foam can be either polyurethane or polyolefin, and it can be either open cell foam, or reticulated and open cell foam. A preferred embodiment includes within the fine particle media 10% by weight of flow-enhancing antimicrobial plastic pellets, about 4-5 mm in diameter and having an aspect ratio of 2-3, the pellets encapsulating an antimicrobial additive.

8 Claims, 2 Drawing Sheets

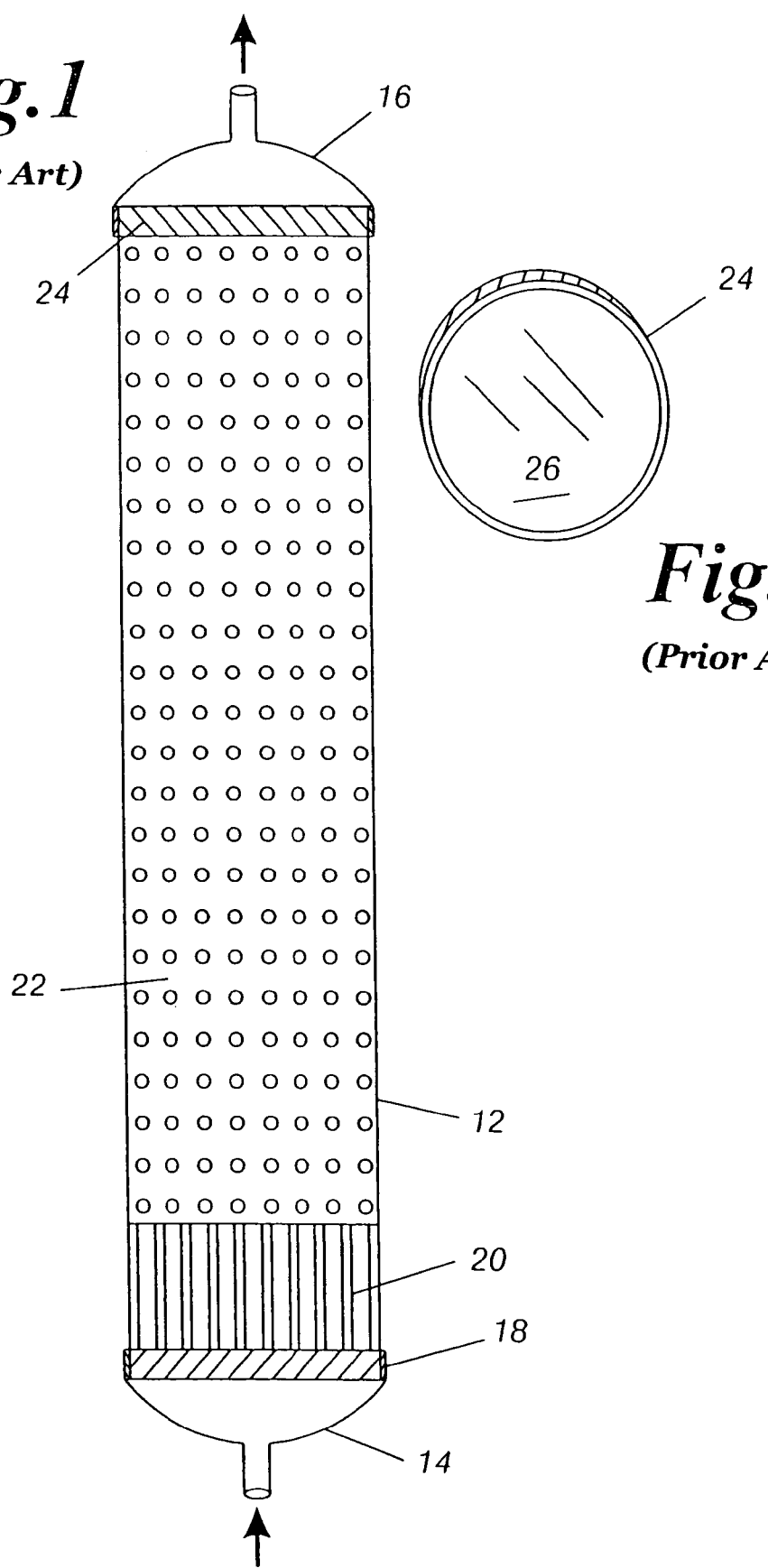

GRANULAR FILTRATION DEVICE FOR WATER

CROSS REFERENCE TO RELATED APPLICATION

This application claims the benefit of U.S. Provisional Application No. 60/647,192, filed Jan. 25, 2005.

FIELD OF THE INVENTION

The present invention relates to a method and apparatus for the treatment and purification of aqueous fluids at the point of use.

BACKGROUND OF THE INVENTION

Filtration devices utilizing various kinds of granular media are extensively used in the treatment and purification of aqueous and non-aqueous fluids. At municipal and industrial applications, these devices take the form of columnar, vessel, or fixed bed configurations, while at point of use consumer applications, they are usually small tubular filters that can be inserted in line in a municipal fluid distribution system or a more limited smaller scale fluid distribution system. While a string wound, melt blown, or other kinds of non-woven filters in similar tubular configuration are primarily intended to remove sediments from the fluids, the filters containing granular material are designed to remove specific contaminants or impurities from the fluids. Depending on the nature of the contaminant, appropriate material is selected having chemical or physical affinity for that particular contaminant or impurity. One of the most commonly used granular medium is an activated carbon for removing color, odor and many types of dissolved organic impurities. Some other commonly used media are green sands, alumina, silica, titania, iron oxide, and synthetic ion exchange resins.

SUMMARY OF THE INVENTION

The invention comprises a novel granular media filter for in-line liquid applications that allows media as fine as 44 micron to be used to increase the removal of contaminants from the liquid with adequate flows consisting of a specific arrangement. A flow distributor has a non-woven fiber web welded to it; followed by a mixture of fine particle media (finer than 20×50 mesh); followed by a compressible chlorine resistant open cell polyurethane foam, then a 5 micron rated meltblown fiber tube attached to the outlet end by melt adhesive on one end and closed with a plastic plug on the other end. The foam can be either polyurethane or polyolefin, and it can be either open cell foam, or reticulated and open cell foam. A preferred embodiment includes within the fine particle media 10% by weight of flow-enhancing antimicrobial plastic pellets, about 4-5 mm in diameter and having an aspect ratio of 2-3, the pellets encapsulating an antimicrobial additive. Aspect ratio is the ratio of length over height. The aspect ratio of fibers tend to be higher depending on the staple length and the diameter of the fiber. "Mesh" throughout this application means American Mesh sizes (ASTM-E-11-61).

OBJECTS OF THE INVENTION

The principal object of the present invention is to provide a point of use granular media filter having incorporated therein plastic pellets that enhance and maintain uniform flow.

Another object of the invention is to provide a filter that incorporates therein plastic pellets that have an antimicrobial additive encapsulated therein which is released to protect the media and the filter components from microbial growth.

BRIEF DESCRIPTION OF THE DRAWINGS

The foregoing and other objects will become more readily apparent by referring to the following detailed description and the appended drawings in which:

FIG. 1 is a schematic cross-section of a conventional tubular filter containing granular activated carbon.

FIG. 2 is a cross section of a conventional distributor disc.

DETAILED DESCRIPTION

Figure 3:
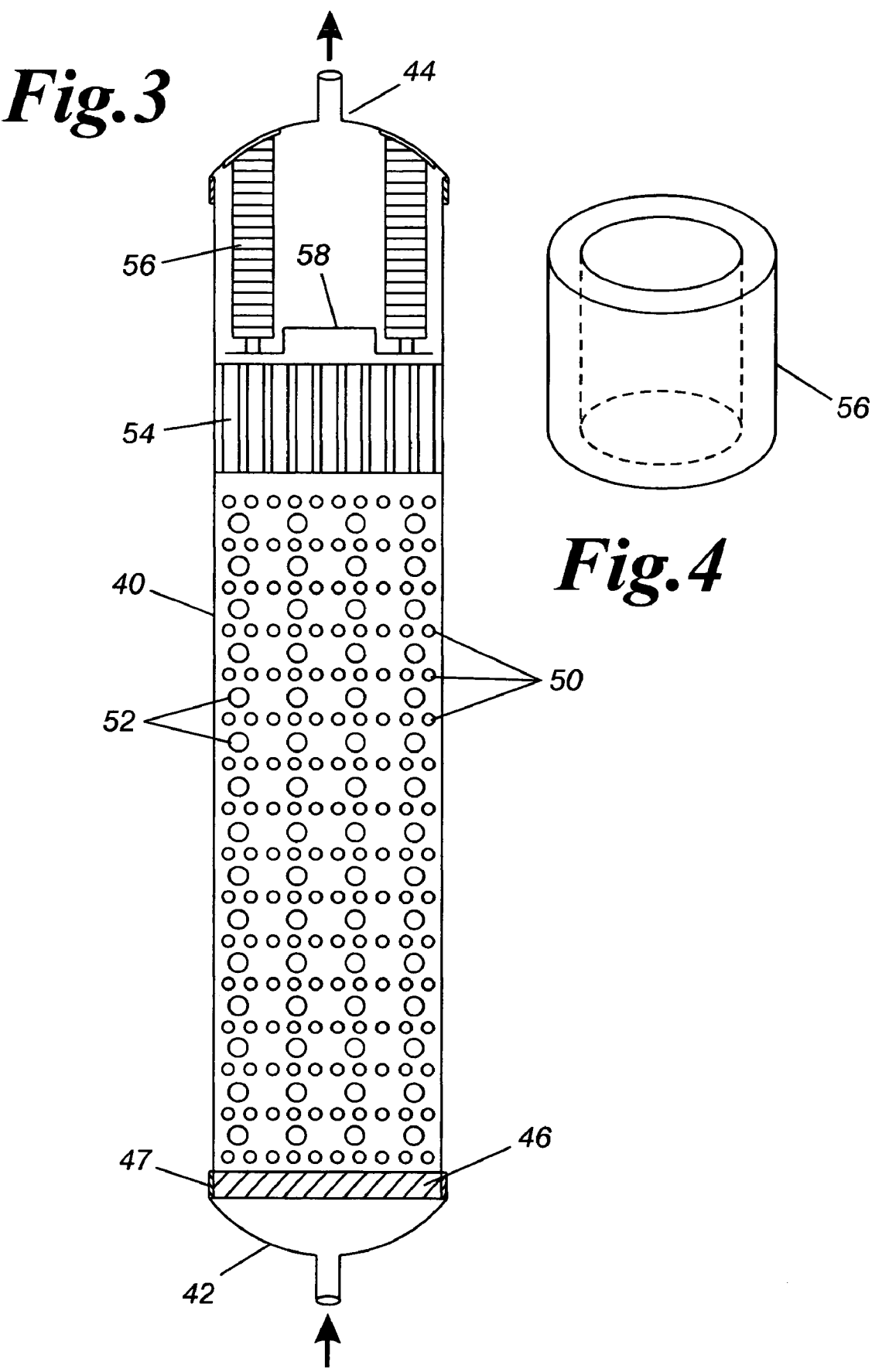
FIG. 3 is a schematic cross section of the invented filter.

In a typical application involving granular media aqueous or non-aqueous fluid containing impurities of contaminants is contacted with the media to adsorb the impurities onto the media and thus purify the said fluid. The effectiveness of this operation depends on the adsorption capacity of the media for the particular impurity and the contact time during which the media has the chance to remove the impurities from the fluid. Even with the optimum adsorption capability of the media for the impurity, if the contact time with the media is insufficient, the impurities will not be fully removed from the fluid. In filtration technology, these solid/liquid contact considerations are expressed quantitatively by the so-called Empty Bed Contact Time (EBCT). EBCT is a ration of the volume of vessel or filter cartridge containing the media and the flow rate (e.g. volume in cc of filter cartridge filled with media divided by cc/min flow). The resultant ratio approximately gives time in minute that the liquid is in contact with the media. In the municipal or industrial applications, it is possible to design the size of the bed or vessel containing media to be large enough to obtain the optimum EBCT, which is generally from 5 to 15 minutes.

In treatment of water for consumers, the various Point-of-Use (POU) devices usually have an EBCT in seconds rather than in minutes. Under such short contact times, the ability of the filter devices to remove impurities is seriously affected. With the limited volume of filter device possible in POU devices and flow rate requirements of 0.5-2 gpm, these devices have severe restrictions in their application, either because the maximum adsorption capacity of the media contained in a limited volume is not sufficient to treat the practical volumes of water containing the impurities or the contact times at practical flow rates in an application are insufficient to remove the impurities. In consumer POU applications, one does not have the freedom to increase the size of the device to ensure optimum contact time. Because of this, it is difficult to remove certain kinds of contaminants from the water using POU devices.

One possible solution to the problem of insufficient contact time in a restrictive sized vessel or filter cartridge is to increase the surface of the media by going to finer material. This usually achieves two purposes:

1) It increases the adsorption capacity per unit weight of the media or, more specifically, per unit volume of the filter housing or the vessel; and 2) achieves better contact with the more exposed surfaces of the media.

This however leads to another problem, that of keeping the fines contained in the vessel or filter housing. In consumer applications, the limited filtering surface or mechanism (usually a nonwoven fiber web welded to a distributor disc or a porous sintered plastic disc) at the fluid ingress and egress of the vessel that contains the media is blinded by fine particles, reducing the flow of the liquid through the device drastically, if not completely. Because of this, most of the granular media filters have the media no finer than minus 20 to plus 50 mesh (841 micron to 297 micron). Even in much larger municipal and industrial applications where one could have the luxury of much larger filtering mechanism to contain the media fines, media smaller than 20×50 mesh is rarely used, optimum mesh size used being either minus 8 to plus 30 mesh (2380 to 595 microns) or minus 12 to plus 40 mesh (1680 to 420 micron). Also, since the size of the vessel in these applications can be increased, there is usually little need for the granular media to be any finer than 12×40 mesh.

Granular size of the adsorbent media that is generally used in water filter applications is:

| MESH SIZE | PARTICLE SIZE (Micron) |
|---|---|
| 8 × 20 | 2380-841 |
| 12 × 40 | 1680-420 |
| 20 × 50 | 841-297 |
| 60 × 80 | 250-177 |
| 80 × 325 | 177-44 |
| <325 | <44 |

For the gravity applications 12×40, 20×50 and 60×80 are the preferred sizes. The broad range of granular particles is 2500 to 25 microns with the preferred size being between 1680 to 177 microns.

We have solved the problem of fine media particles clogging the consumer POU water treatment devices, while increasing their effectiveness for the removal of contaminants through improved contact time without causing appreciable reduction in the flow of the water due to plugging of the filtering surfaces at the fluid ingress and egress of the device. By practicing this invention, it is possible to construct in-line consumer POU filters that contain media such as activated carbon, alumina, silica, titania, green sand, synthetic ion exchange resins, or mixtures thereof, as fine as minus 80 to plus 325 mesh (177 to 44 microns) that affords removal of many kinds of contaminants from large volumes of water at practical flow rate without causing any appreciable reduction in the flow due to plugging with fine particles. This is unprecedented for a granular filtration device of this kind. We have been able to achieve this result by increasing the surface area of the filter that contains the media approximately by a factor of 7. This, plus some other changes in the construction of the filter has allowed us to improve the performance and the longevity of an in-line filter device to a great extent.

FIG. 1 shows the construction of a conventional in-line Granular Activated Carbon Filter that is about normally 10 inches long with a diameter of 2.5 inches. It consists of a tubular housing 12 with a tapered inlet port 14 and outlet port 16 for the ingress and egress of water. After the inlet port, there is a flow distributor disc 18 which has a nonwoven fiber web on the inside followed by an open cell compressible polyurethane foam material 20 that compresses the activated granular carbon material 22 (usually no finer than 20×50 mesh) following it and ensures that the material stays as a continuous column without any channeling within the media. Before the outlet port 16, there is a plastic distributor disc 24, on the inside face of which, touching and containing the media is a nonwoven polypropylene web 26 sonically welded to the disc that serves to contain the media. Both of the distributor discs on the inlet and outlet side are sonically welded to the filter housing. Some other constructions use sintered polyethylene discs or some other kind of rigid filter on either end to contain the media.

As mentioned above, the filter of this type is incapable of utilizing granular material finer than 20×50 mesh, because the sonically welded nonwoven fiber web is unable to contain the finer material and usually is plugged prematurely by the finer particles.

Figure 4:
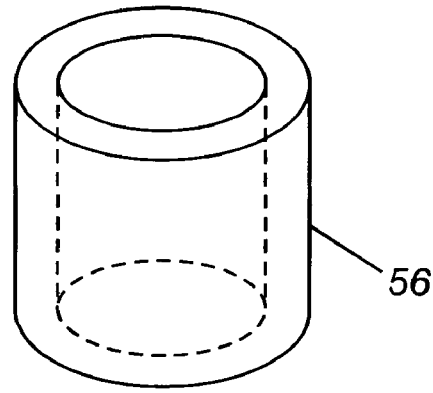
FIG. 4 is a schematic isometric view of the melt-blown fiber tube in the outlet area of the invented filter.

The granular activated carbon filter of this invention is shown in FIGS. 3 and 4. It consists of a tubular housing 40, preferably 10 inches long and 2.5 inches in diameter, with tapered inlet port 42 and outlet port 44 that can be inserted into the distribution line by appropriate coupling attachments. Following the inlet port 42 is a distributor disc 46 with non-woven polypropylene fiber web on its inside surface (sonically welded at 47). This disc 46 itself is also sonically welded to the housing 40. Following the distributor disc, the housing is filled by a mixture of activated carbon 50 as fine as 80×235 mesh mixed with larger disc-shaped plastic pellets 52 that have a diameter of about 4 mm and a height of about 2 mm. These plastic pellets are present in an amount up to 10% of the total weight of the media and preferably have an aspect ratio of 2, and serve two purposes. They aid in the uniform distribution of flow lines through the media and also protect the carbon media from bacterial growth, since they encapsulate an antimicrobial compound and release it in minute and safe amounts that are acceptable for drinking water applications, as determined by regulatory agencies such as the EPA. Following the activated carbon media is a compressible open cell polyurethane foam 54 that prevents channeling in the activated carbon media. At the outlet is attached a 2 inch tube 56 made of a meltblown polypropylene fiber, the open end of which is blocked by a plastic plug 58, ensuring that all the water flows through the sides of tube 56 from outside to inside. The tube 56 is constructed of various porosities from 1 to 100 microns and of varying thickness. The opposite end of tube 56 is attached to the end plate by melt adhesive. The high surface area of this meltblown fiber tube is at least 7 times larger than a flat disc type filtering mechanism, contains all the fine particles, and allows maintenance of adequate flow of treated water. The polyurethane foam is preferably resistant to chlorine dissolved in the municipal water to sub-ppm level. The meltblown polypropylene tube is rated to exclude particles greater than 5 microns and is able to block extremely small particles, such as 44 micron particles, in the mixture easily without causing any plugging.

The antimicrobial additive is advantageously selected from silver (elemental silver or nanoparticle silver), zinc, silver-zinc-zeolites, Triclosan (2,4,4'-trichloro-2'-hydroxydiphenyl ether), diiodomethyl-4-tolylsulfone; zinc 2-mercaptopyridine-N-oxide; N-alkyl-N,N-dimethyl-N-benzylammonium chloride; sodium-O-phenylphenate; 1-5 pentanedial (Glutaraldehyde); 2,2-dibromo-3-nitrilopropionamide; and cis 1-(3chloroallyl)-357-triaza-1-azoniaadamantane.

Instead of sonic welding, the plastic items can be fixed by hot melt adhesive or by ultraviolet welding, or by contact with solvent.

SUMMARY OF THE ACHIEVEMENT OF THE OBJECTS OF THE INVENTION

From the foregoing, it is readily apparent that we have invented an improved a point of use granular media filter having incorporated therein plastic pellets that enhance and maintain uniform flow, the plastic pellets having an antimicrobial additive encapsulated therein which is released to protect the media and the filter components from microbial growth.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

We claim:

1. A filter having a housing with an inlet port and an outlet port for in-line liquid applications that allows media as fine as 44 micron to be used to increase the removal of contaminants from the liquid with adequate flows consisting of the following specific arrangement within said housing:
   a) a flow distributor adjacent said inlet port and having a non-woven fiber web welded thereto;
   b) followed by a mixture of fine particle media (finer than 20×50 mesh) and plastic pellets having antimicrobial additive,
   c) followed by a compressible chlorine-resistant open cell polyurethane or polyolefin foam,
   d) followed by a 5 micron rated fiber tube attached to the outlet port by melt adhesive on one end and closed with a plastic plug on the other end.

2. A filter according to claim 1, wherein said mixture has 10% by weight of said plastic pellets that are 4 to 5 mm in diameter and have an aspect ratio of 2-3, said pellets encapsulating said antimicrobial additive.

3. A filter according to claim 1, wherein said fine particle media is selected from the group consisting of activated carbon, alumina, titania, green sand, iron oxide, and both cationic and anionic synthetic ion exchange resins, and mixtures thereof.

4. A filter according to claim 1, wherein said fine particle media has differing particle mesh sizes and varying specific gravity, and where at least one of the components is as fine as 325 mesh (44 microns).

5. A filter according to claim 1 wherein the polypropylene tube is adjacent said outlet port may be constructed of various porosities from 1 micron to 100 microns, and of varying thickness.

6. A filter according to claim 5 wherein the porosity of said polypropylene tube is from 1 to 20 microns.

7. A filter according to claim 1, wherein said antimicrobial additive is selected from the group consisting of silver (elemental silver or nanoparticle silver), zinc, silver-zinc-zeolites, Triclosan (2,4,4'-trichloro-2'-hydroxydiphenyl ether), diiodomethyl-4-tolylsulfone; zinc 2mercaptopyridine-N-oxide; N-alkyl -N,N-dimethyl-N-benzylammonium chloride; sodium-O-phenylphenate; 1-5 pentanedial(Glutaraldehyde); 2,2-dibromo-3-nitrilopropionamide; and cis 1-(3-chloroallyl)-357-triaza-1-azoniaadamantane.

8. A filter according to claim 1, wherein said open cell polyurethane or polyolefin foam is reticulated.

* * * * *